(12) United States Patent
Chen

(10) Patent No.: US 6,424,472 B1
(45) Date of Patent: Jul. 23, 2002

(54) LENS ASSEMBLY

(76) Inventor: Wen Ching Chen, P.O. Box 2103, Taichung (TW)

( * ) Notice: Subject to any disclaimer, the term of this patent is extended or adjusted under 35 U.S.C. 154(b) by 0 days.

(21) Appl. No.: 09/826,771

(22) Filed: Apr. 6, 2001

(51) Int. Cl.[7] .................................................. G02B 7/02
(52) U.S. Cl. ........................ 359/819; 359/823; 359/824
(58) Field of Search ................................. 359/810, 811, 359/813, 814, 819, 821, 822, 823, 824, 826, 830; 353/100; 396/529

(56) References Cited

U.S. PATENT DOCUMENTS

| | | | | |
|---|---|---|---|---|
| 4,472,024 A | * | 9/1984 | Konomura et al. | 359/814 |
| 4,643,522 A | * | 2/1987 | Takashima | 359/824 |
| 4,764,911 A | * | 8/1988 | Morota et al. | 369/30.15 |
| 4,769,803 A | * | 9/1988 | Yamamiya | 369/44.16 |
| 5,850,575 A | * | 12/1998 | Ohishi | 396/52 |
| 6,278,666 B1 | * | 8/2001 | Nakata et al. | 369/13 |
| 6,359,740 B1 | * | 3/2002 | Tsuchiya | 359/819 |

* cited by examiner

*Primary Examiner*—Georgia Epps
*Assistant Examiner*—Saeed Seyrafi

(57) ABSTRACT

A lens assembly including a lens seat and a lens holder. A lens is disposed on the lens seat. Another lens is inlaid in the lens holder. The lens holder is slidably disposed in a receptacle of the lens seat. An electromagnetic coil is disposed around the circumference of the lens seat. The lens holder is made of magnetic conductive material. After the coil is powered on, the coil creates a magnetic force to push and move the lens holder and change the distance between the lenses and thus adjust the focal length of the lens assembly. A resilient member is disposed between the lens holder and the lens seat for resiliently pushing and restoring the lens holder.

5 Claims, 6 Drawing Sheets

LENS ASSEMBLY

BACKGROUND OF THE INVENTION

The present invention is related to a lens assembly, and more particularly to a lens assembly which employs an electromagnetic coil for creating magnetic force to adjust the focal length of the lens assembly.

FIG. 6 shows a conventional CCD lens assembly including a hollow lens seat 92 mounted on the CCD module 91. The lens seat 92 is formed with an inner thread section 921 in which a lens holder 93 is screwed. A lens 94 is disposed on the lens holder 93.

Such CCD lens assembly adjusts focal length by means of rotating the lens holder 93. However, the adjustment must be manually made and the adjustment range is limited. Moreover, with respect to the CCD lens assembly, it is hard to further adjust the focal length.

In the mechanical focusing mechanism of existent lens assembly, a motor via a reducing gear assembly drives the lens holder for adjusting focal length. Such structure is complicated and quite expensive so that it can be hardly widely used.

SUMMARY OF THE INVENTION

It is therefore a primary object of the present invention to provide a lens assembly. An electromagnetic coil is wound around the circumference of the lens seat. The lens holder is made of magnetic conductive material. After the coil is powered on, the coil creates a magnetic force to push and move the lens holder and change the distance between the lenses and thus adjust the focal length of the lens assembly.

It is a further object of the present invention to provide a lens assembly which is adjustable in focal length. The lens assembly has very simple structure and is manufactured at low cost.

The present invention can be best understood through the following description and accompanying drawings wherein:

DETAILED DESCRIPTION OF THE PREFERRED EMBODIMENTS

Figure 1:
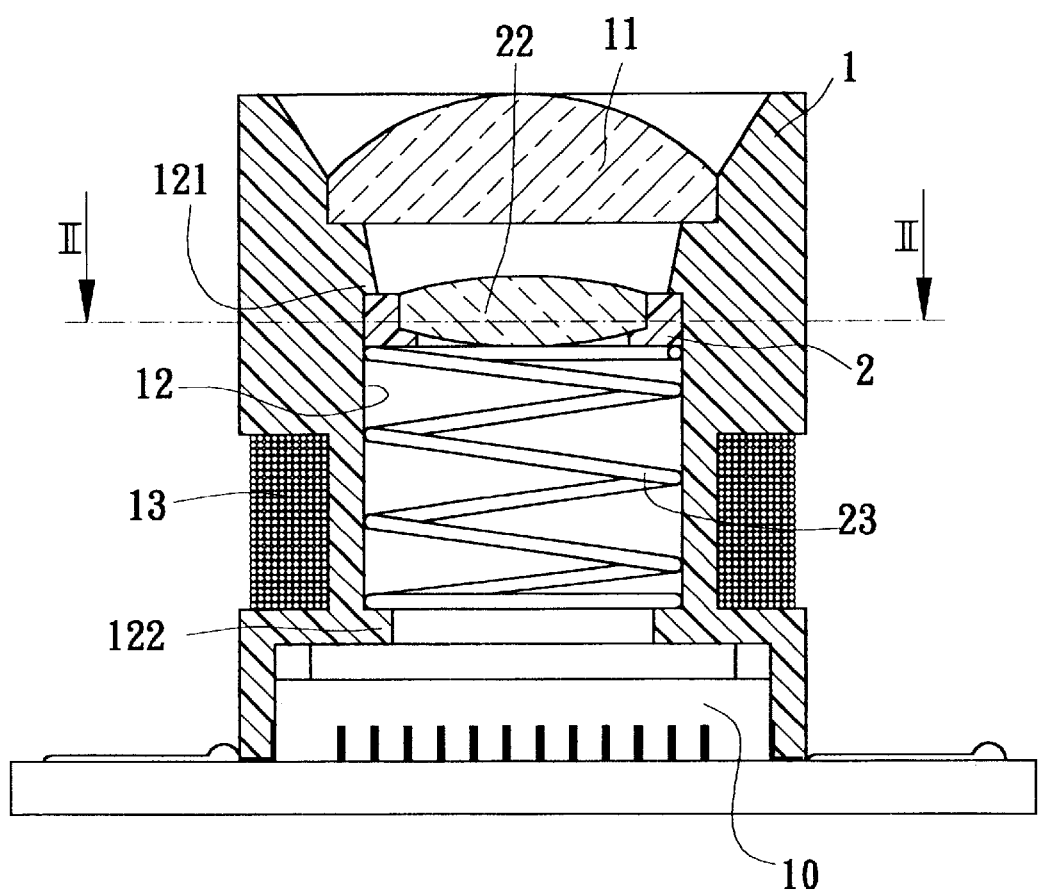
FIG. 1 is a sectional view showing the structure of the lens assembly of the present invention.
Figure 2:
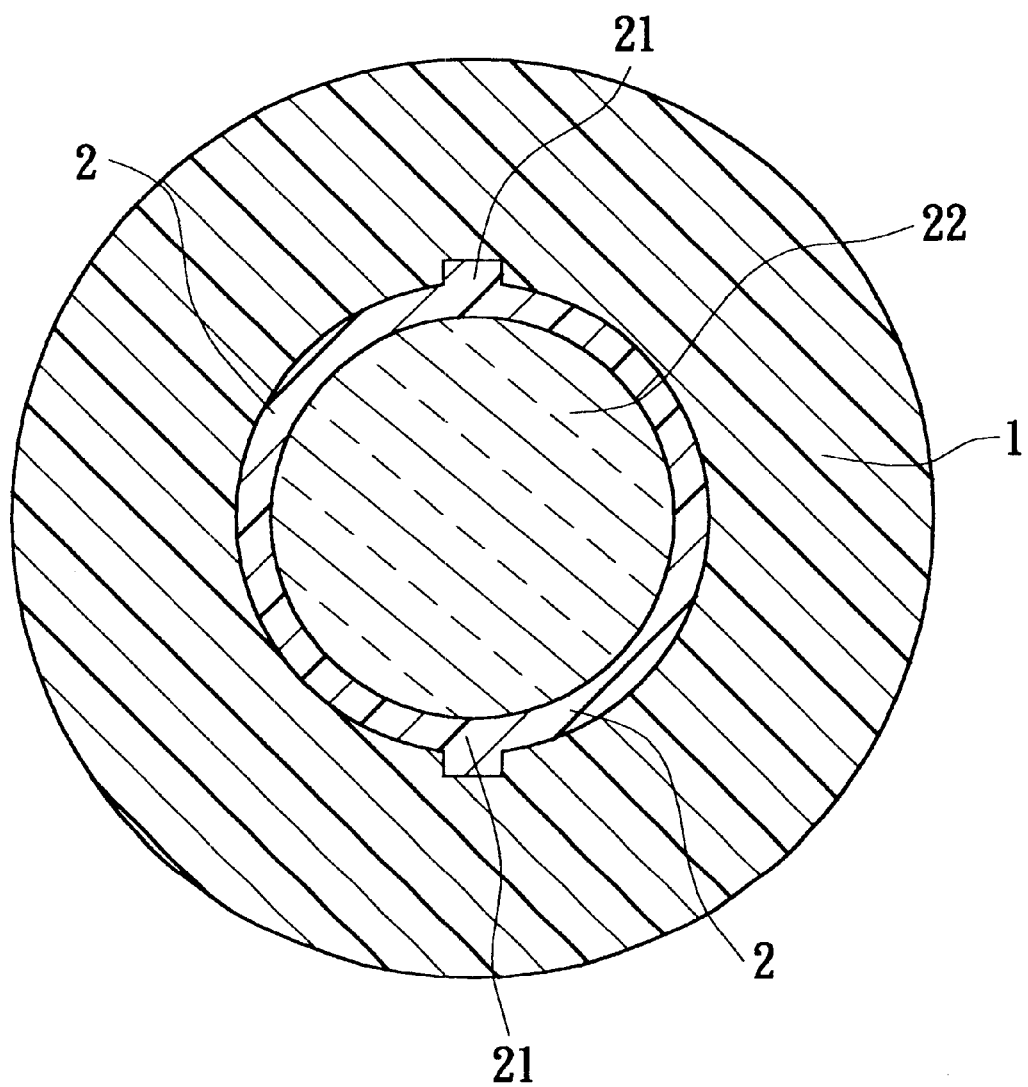
FIG. 2 is a sectional view taken along line II—II of FIG. 1.
Figure 3:
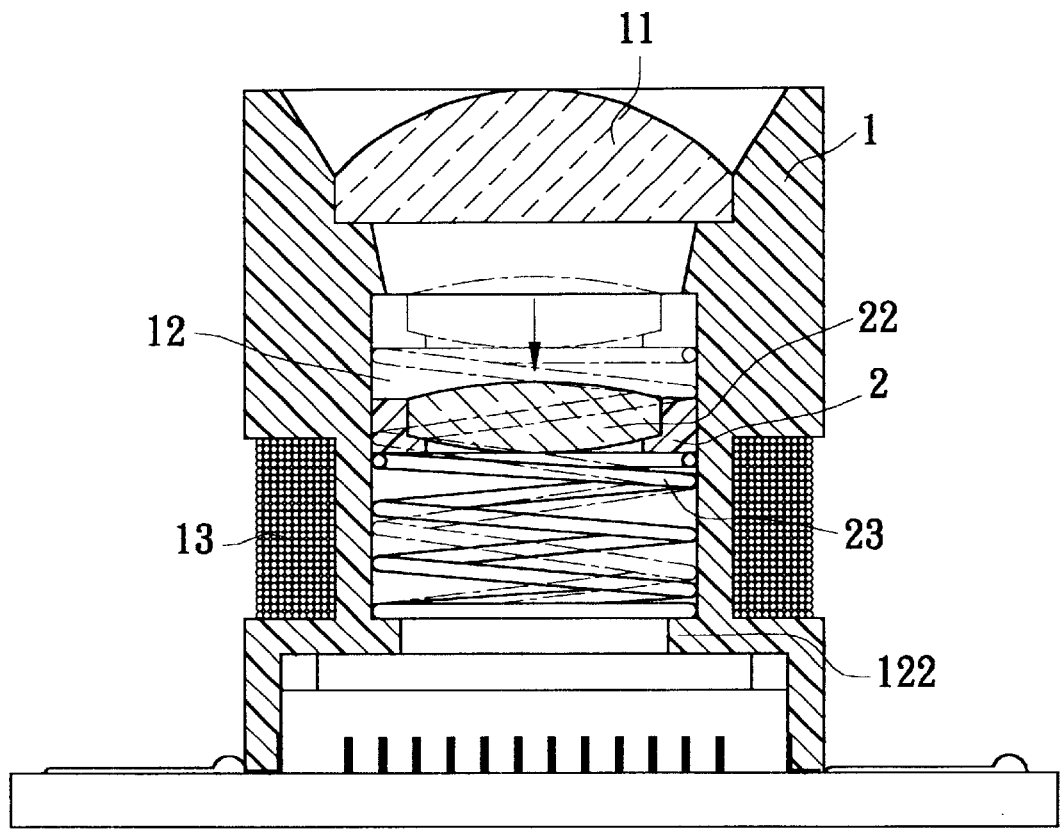
FIG. 3 is a sectional view showing the adjustment of focal length of the lens assembly of the present invention.

Please refer to FIGS. 1 to 3. The lens assembly of the present invention includes:

a lens seat 1 mounted on a CCD or CMOS module 10, a lens 11 being disposed on the top of the lens seat 1, the lens seat 1 being formed with a central receptacle 12, an electromagnetic coil 13 being disposed around the outer circumference of the bottom section of the lens seat 1; and a lens holder 2 slidably disposed in the receptacle 12 of the lens seat 1, the lens holder 2 having two projecting sections 21, the receptacle 12 having a shape complementary to the lens holder 2, whereby the lens holder 2 is slidable within the receptacle 12 without rotation, the lens holder 2 being made of magnetic conductive metal material, whereby after the coil 13 is powered on, the lens holder 2 is magnetically attracted to move downward, a lens 22 being inlaid in the lens holder 2, the upper and lower sections of the receptacle 12 being respectively formed with an upper and a lower stop sections 121, 122, the lens holder 2 being disposed between the upper and lower stop sections 121, 122, a spring 23 being disposed between the lens holder 2 and the lower stop section 122, whereby in normal state, the lens holder 2 is pushed by the spring 23 to abut against the upper stop section 121, the spring 23 serving to resiliently push and restore the, lens holder 2.

Referring to FIG. 3, when adjusting focal length, the coil 13 is powered on to magnetically attract the lens holder 2 to move downward. At this time, the spring 23 is compressed. When the magnetic attraction of the coil 13 is equal to the reaction force of the spring 23, the lens holder 2 will stop moving downward. Accordingly, by means of controlling the current, the magnetic force created by the coil 13 can be varied to change the displacement of the lens holder 2 so as to change the distance between the lens 11 and the lens 22. Therefore, the focal length of the lens assembly can be adjusted.

The above lens assembly has very simple structure and is manufactured at low cost. Furthermore, the structure is not mechanical transmission measure so that no noise will be produced and the possibility of failure is reduced.

Figure 4:
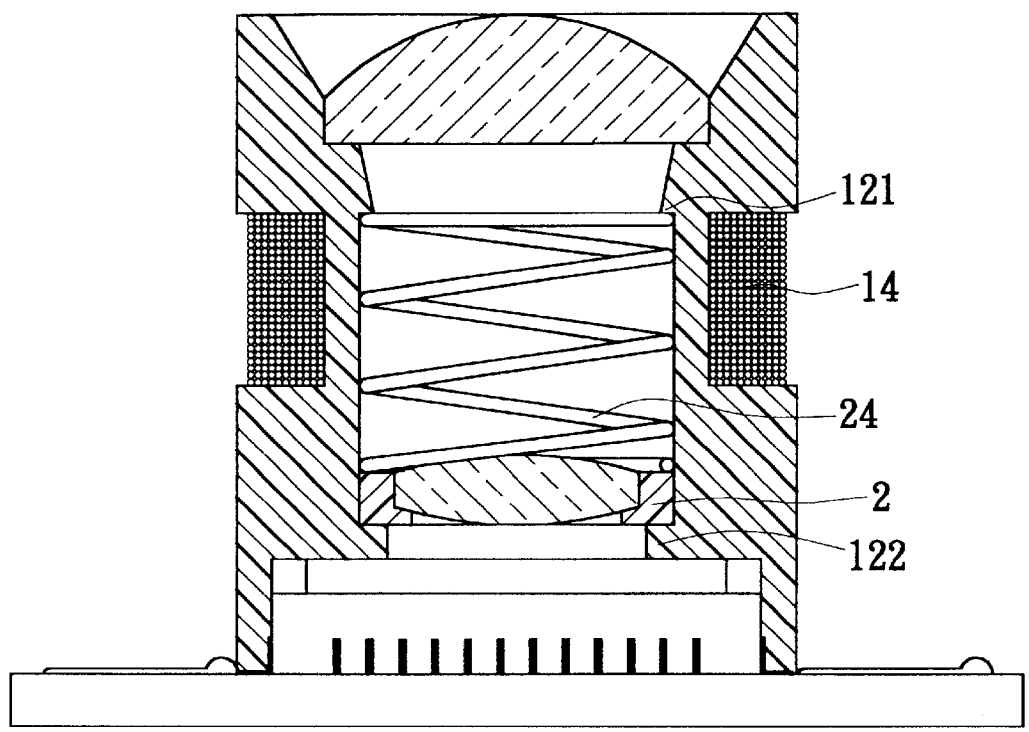
FIG. 4 is a sectional view showing the structure of a second embodiment of the lens assembly of the present invention.

FIG. 4 shows a second embodiment of the present invention, in which the spring 24 is disposed between the lens holder 2 and the upper stop section 121. In normal state, the lens holder 2 is pushed by the spring 24 to abut against the lower stop section 121. The coil 14 is disposed around the outer circumference of upper section of the lens seat 1. This can achieve the same function as the first embodiment.

Figure 5:
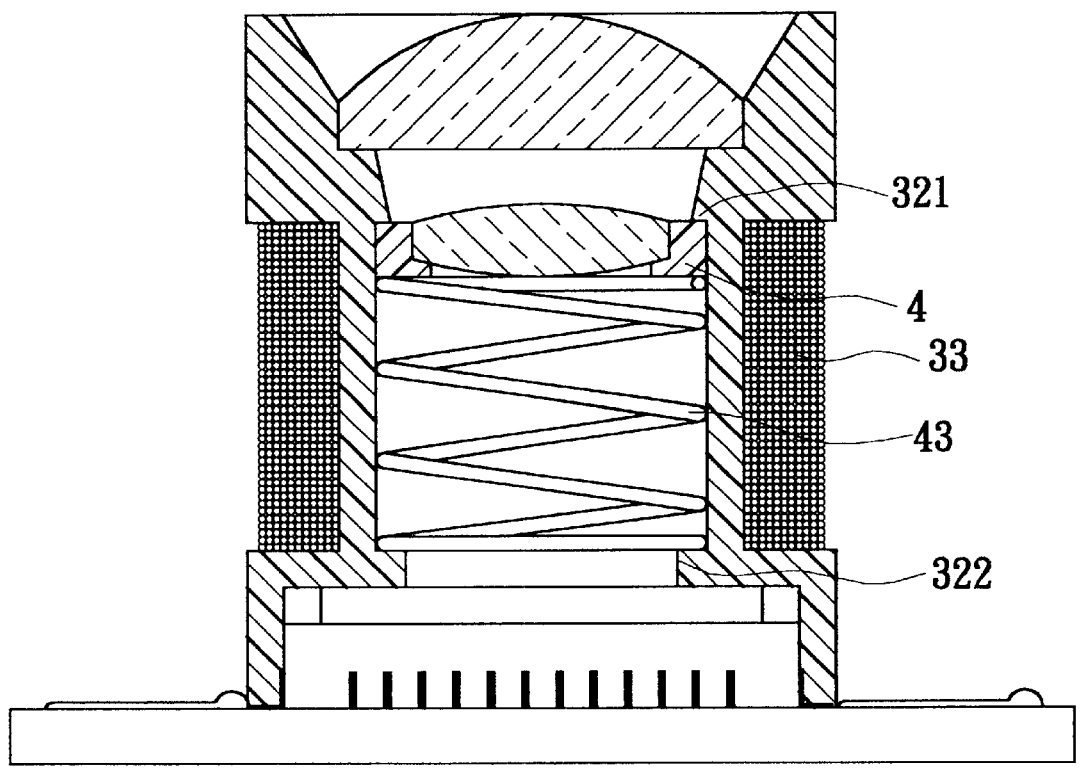
FIG. 5 is a sectional view showing the structure of a third embodiment of the lens assembly of the present invention.
Figure 6:
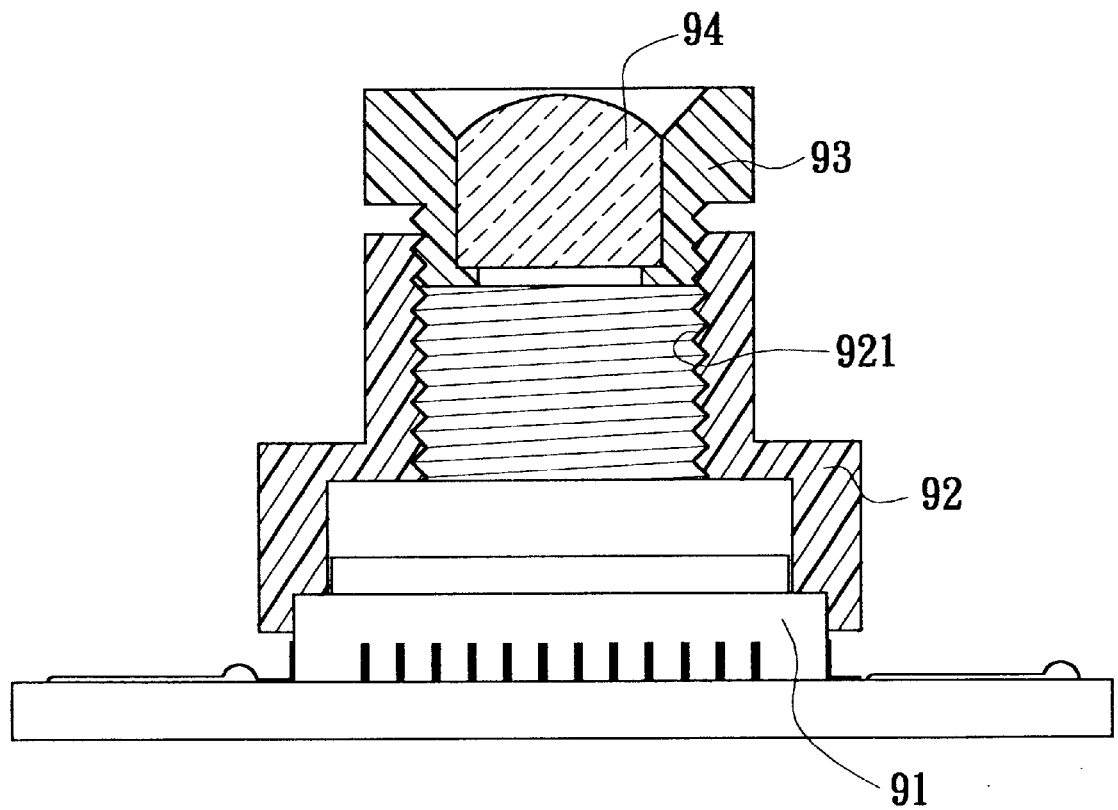
FIG. 6 shows a conventional lens assembly.

FIG. 5 shows a third embodiment of the present invention, in which the lens holder 4 is made of magnetic material. A spring 43 is disposed between the lens holder 4 and the lower stop section 322. In normal state, the lens holder 4 is pushed by the spring 43 to abut against the upper stop section 321. According to principle of magnetic repelling, after the coil 33 is powered on, when the direction of magnetic field (direction of pole N of magnetic indicator) created by the coil 33 is identical to the direction of magnetic field of the lens holder 4, the magnetic force of the coil 33 will downward repel the lens holder 4. This can achieve the same function as the first embodiment.

The above embodiments are only used to illustrate the present invention, not intended to limit the scope thereof. Many modifications of the above embodiments can be made without departing from the spirit of the present invention.

What is claimed is:

1. A lens assembly comprising:

a lens seat, a lens being disposed on a top section of the lens seat, the lens seat being formed with a central receptacle, an electromagnetic coil being disposed around the circumference of the lens seat; and a lens holder slidably disposed in the receptacle of the lens seat, the lens holder being made of magnetic conductive material, whereby after the coil is powered on, the coil creates a magnetic force to push and move the lens holder, a lens being inlaid in the lens holder, a resilient member being disposed between the lens holder and the lens seat, whereby the resilient member serves to resiliently push and restore the lens holder.

2. A lens assembly as claimed in claim 1, wherein the lens holder has a non-circular cross-section and the receptacle of the lens seat has a shape complementary to the lens holder, whereby the lens holder is slidable within the receptacle without rotation.

3. A lens assembly as claimed in claim 1, wherein the lens holder is made of magnetic conductive metal material.

4. A lens assembly as claimed in claim 1, wherein the lens holder is made of magnetic material.

5. A lens assembly as claimed in claim 1, wherein the upper and lower sections of the receptacle of the lens seat are respectively formed with an upper and a lower stop sections, the lens holder and the resilient member respectively abutting against the upper and lower stop sections which serve as upper and lower dead ends of the lens holder and the resilient member.

* * * * *